(12) United States Patent
Zeller et al.

(10) Patent No.: US 10,375,755 B2
(45) Date of Patent: Aug. 6, 2019

(54) APPARATUSES, METHODS AND COMPUTER PROGRAMS FOR A BASE STATION TRANSCEIVER AND FOR A MOBILE TRANSCEIVER

(71) Applicant: Alcatel Lucent, Boulogne Billancourt (FR)

(72) Inventors: Dietrich Karl Zeller, Stuttgart (DE); Uwe Doetsch, Stuttgart (DE)

(73) Assignee: Alcatel Lucent, Nozay (FR)

( * ) Notice: Subject to any disclaimer, the term of this patent is extended or adjusted under 35 U.S.C. 154(b) by 166 days.

(21) Appl. No.: 15/125,631

(22) PCT Filed: Feb. 2, 2015

(86) PCT No.: PCT/EP2015/052039
§ 371 (c)(1),
(2) Date: Sep. 13, 2016

(87) PCT Pub. No.: WO2015/135690
PCT Pub. Date: Sep. 17, 2015

(65) Prior Publication Data
US 2017/0013669 A1 Jan. 12, 2017

(30) Foreign Application Priority Data
Mar. 13, 2014 (EP) .................................. 14305360

(51) Int. Cl.
*H04W 4/00* (2018.01)
*H04W 76/25* (2018.01)
(Continued)

(52) U.S. Cl.
CPC .............. *H04W 76/25* (2018.02); *H04B 7/14* (2013.01); *H04L 43/028* (2013.01);
(Continued)

(58) Field of Classification Search
CPC ...... H04W 76/25; H04W 88/08; H04L 67/26; H04L 43/028; H04L 43/103; H04L 43/0811; H04B 7/14
(Continued)

(56) References Cited

U.S. PATENT DOCUMENTS

2005/0278418 A1 12/2005 Rathakrishnan et al.
2007/0088790 A1 4/2007 Shenfield et al.
(Continued)

FOREIGN PATENT DOCUMENTS

CN 103587894 A 2/2014
JP 2005-525631 8/2005
(Continued)

OTHER PUBLICATIONS

China Mobile et al., "Elimate keep-alive package by network-based always-on solution", 3GPP, SA WG2 Meeting #96, S2-131499, pp. 1-4, XP050711608, Apr. 8-12, 2013. (From Applicant's IDS filed on Sep. 13, 2016).*
(Continued)

*Primary Examiner* — Mang Hang Yeung
(74) *Attorney, Agent, or Firm* — Fay Sharpe LLP

(57) ABSTRACT

The control module (16) of the apparatus is operable to relay data packets of the data service between the mobile transceiver (200) and the data server (300). The control module (16) is further operable to determine a control data packet for the data service between the data server (300) and the mobile transceiver (200). The control data packet is intended to maintain a connection established between the data server (300) and the mobile transceiver (200). The control module (16) is further operable to provide a reply data packet for the control data packet to the data server (300) without relaying the control data packet to the mobile transceiver (200), and/or generate and provide the control data packet to the data server (300).

15 Claims, 6 Drawing Sheets

(51) Int. Cl.
   H04L 12/26    (2006.01)
   H04B 7/14    (2006.01)
   H04L 29/08    (2006.01)
   H04W 88/08    (2009.01)
(52) U.S. Cl.
   CPC ........ *H04L 43/0811* (2013.01); *H04L 43/103* (2013.01); *H04L 67/26* (2013.01); *H04W 88/08* (2013.01)
(58) Field of Classification Search
   USPC ........................................................ 370/329
   See application file for complete search history.

(56) References Cited

U.S. PATENT DOCUMENTS

| | | | | |
|---|---|---|---|---|
| 2009/0252072 | A1* | 10/2009 | Lind | H04W 76/25 370/311 |
| 2013/0190032 | A1* | 7/2013 | Li | H04L 67/26 455/517 |

FOREIGN PATENT DOCUMENTS

| | | |
|---|---|---|
| JP | 2009-088934 | 4/2009 |
| WO | WO 2011/153313 | 8/2011 |
| WO | WO 2013/109550 | 7/2013 |
| WO | WO 2014/010761 A1 | 1/2014 |

OTHER PUBLICATIONS

China Mobile et al., "Eliminate keep-alive package by network-based always-on solution," 3$^{rd}$ Generation Partnership Project (3GPP), SA WG2 Meeting #96, S2-131499, pp. 1-4, XP050711608, San Diego, USA, Apr. 8-12, 2013.

3$^{rd}$ Generation Partnership Project; Technical Specification Group Services and System Aspects; Machine-Type and other Mobile Data Applications Communications Enhancements (Release 12), 3GPP TR 23.887 V1.1.0, pp. 1-153, XP050712157, Jul. 2013).

International Search Report for PCT/EP2015/052039 dated Apr. 20, 2015.

* cited by examiner

APPARATUSES, METHODS AND COMPUTER PROGRAMS FOR A BASE STATION TRANSCEIVER AND FOR A MOBILE TRANSCEIVER

TECHNICAL FIELD

Embodiments relate to apparatuses, methods and computer programs for a base station transceiver and a mobile transceiver, more particularly but not exclusively, to a control mechanism for a signaling load generated in a radio access network by keepalive messages of data services.

BACKGROUND

This section introduces aspects that may be helpful in facilitating a better understanding of the invention(s). Accordingly, the statements of this section are to be read in this light and are not to be understood as admissions about what is in the prior art or what is not in the prior art.

Demands for higher data rates for mobile services are steadily increasing. At the same time modern mobile communication systems as 3rd Generation systems (3G) and 4th Generation systems (4G) provide enhanced technologies, which enable higher spectral efficiencies and allow for higher data rates and cell capacities. The demands are growing for both directions of transmission, in the DownLink (DL) for transmission from the network infrastructure to a mobile transceiver, as well as in the UpLink (UL) for transmission from a mobile transceiver to the network infrastructure.

The introduction of smartphone applications may lead to network usage patterns, which might not be reflected in the design of current wireless broadband networks, such as Long Term Evolution (LTE) and LTE-Advanced (LTE-A). In current $3^{rd}$ Generation Partnership Project (3GPP) standardization a strategic areas is "System capacity and stability" among other areas such as WIreless FIdelity (WIFI) integration and new business opportunities by critical communications and public safety. A prominent issue is the proliferation of applications relying on push services, i.e. instant notifications, when e.g. new e-mails have arrived, when breaking news occur, when SoftWare (SW) updates became available, when weather conditions changed, when a new Instant Message (IM) arrived, etc.

The canonical technique to implement such notification services is by the use of persistent connections between the respective Application (App) and a corresponding application server, e.g. an e-mail App connected to an e-mail server, a news App connected to a news server, a weather App connected to a weather info server, App store, an Instant Messenger (IM) App, etc. Many of those cases use Transport Control Protocol (TCP) connections. However the sheer number of all these persistent, idling TCP connections between the millions of smartphones and the tens of applications on each smartphone may represent a high load for the networks, which might not have been expected when designing LTE, for example. In the fixed Internet the traffic this background 'signaling' traffic may be acceptable. The high number of bearers and the very high (signaling) load caused by idling TCP connections for notification purposes generates an extreme signaling overhead in wireless networks potentially leading to overload and service disruption situations.

Document S2-131499 of 3GPP System Architecture (SA) Working Group 2 (WG2) Meeting #96, San Diego, U.S.A., Apr. 8-12, 2013, discloses a concept for keeping an always-on connection by holding Packet Data Protocol (PDP) context and the public Internet Protocol (IP) address/port binding in the Network Address Translation (NAT) in a network. In this way, the application might not need to send heartbeats any longer. Document 3GPP Technical Report (TR) 23.887 V1.1.0, 2013-07, Technical Specification Group Services and System Aspects; Machine-Type and other Mobile Data Applications Communications Enhancements, (Release 12), studies and evaluates architectural enhancements for machine type and other mobile data applications communications.

SUMMARY OF ILLUSTRATIVE EMBODIMENTS

Some simplifications may be made in the following summary, which is intended to highlight and introduce some aspects of the various exemplary embodiments, but such simplifications are not intended to limit the scope of the invention(s). Detailed descriptions of a preferred exemplary embodiment adequate to allow those of ordinary skill in the art to make and use the inventive concepts will follow in later sections.

Various embodiments provide apparatuses, methods and computer programs for a base station transceiver and a mobile transceiver. Embodiments may provide a control mechanism for a signaling load generated in a radio access network by keepalive messages of data services. Embodiments may enable a base station transceiver to reply, answer or respond to keepalive messages transmitted from a data server, and/or to generate keepalive messages and provide the generated keepalive messages to a data server. The keepalive messages are intended to maintain a connection to a mobile transceiver. Embodiments may therefore reduce or even avoid a load generated on an air interface between a base station transceiver and a mobile transceiver as the transmission of keepalive messages over the air interface is reduced or even avoided.

Embodiments provide an apparatus, which is operable in a base station transceiver of a mobile communication system, to which it is also referred to as base station transceiver apparatus. The base station transceiver apparatus comprises a transceiver module, which is operable to communicate with a mobile transceiver. The mobile transceiver uses a data service provided by a data server. The base station transceiver apparatus further comprises an interface, which is operable to communicate with the data server providing the data service to the mobile transceiver. The base station transceiver apparatus further comprises a control module, which is operable to control the transceiver module and the interface. The control module is operable to relay data packets of the data service between the mobile transceiver and the data server. The control module is operable to determine a control data packet for the data service between the data server and the mobile transceiver. The control data packet is intended to maintain a connection established between the data server and the mobile transceiver. The control module is further operable to provide a reply data packet for the control data packet to the data server without relaying the control data packet to the mobile transceiver, and/or to generate the control data packet and to provide the data packet to the data server. Embodiments may enable a reduction of a signaling load on an air interface between a base station transceiver and a mobile transceiver.

In some embodiments the control module of the base station transceiver apparatus may be operable to determine the control data packet using packet inspection of the data packets transmitted from the data server to the mobile transceiver. The control module may be operable to determine the control data packet by monitoring data packets of the same size being periodically transmitted from the data server to the mobile transceiver. Embodiments may enable a reduction of the signaling load on the air interface by using packet inspection at the base station transceiver, such that a control mechanism may be enabled, which may be transparent to the mobile transceiver.

In further embodiments the control module of the base station transceiver apparatus may be operable to determine whether a data packet transmitted from the data server to the mobile transceiver comprises a payload data portion. The control module may be further operable to determine the control data packet when the payload data portion is missing in the data packet. The control module may be operable to relay a data packet to the mobile transceiver when the data packet comprises a payload data portion. Embodiments may enable a control mechanism for the signaling load based on data packet format analysis, for example. based on a determination whether a data packet of a data service has a payload example. based on a determination whether a data packet of a data service has a payload portion. Embodiments may enable efficient detection of keepalive messages.

In some embodiments the control module may be operable to receive configuration information from the mobile transceiver using the transceiver module. The configuration information indicates that a control data packet for the data service being intended to maintain a connection established between the data server and the mobile transceiver is to be determined and replied to at the base station transceiver without relaying the control data packet to the mobile transceiver. Additionally or alternatively, the configuration information may indicate that a control data packet for the data service being intended to maintain a connection established between the data server and the mobile transceiver is to be generated at the base station transceiver, which may then provide the control data packet to the data server. In other words, embodiments may allow a reduction of the signaling load on the air interface in the uplink, the downlink or both. Control signaling may be terminated at the base station transceiver apparatus by detecting and replying to control data packets transmitted by the data server, by generating and providing/transmitting control data packets to the data server without involving the mobile transceiver, or both.

Correspondingly, embodiments further provide an apparatus, which is operable in a mobile transceiver of a mobile communication system, and to which it is also referred to as mobile transceiver apparatus. The mobile transceiver apparatus comprises a transceiver module, which is operable to communicate with a base station transceiver and a data server. The mobile transceiver uses a data service provided by the data server. The mobile transceiver apparatus further comprises a control module, which is operable to control the transceiver module. The control module is further operable to generate configuration information related to the data service. The configuration information indicates that a control data packet for the data service, which is intended to maintain a connection established between the data server and the mobile transceiver is to be determined, for example detected and replied to the data server or generated and provided to the data server, at the base station transceiver without relaying the control data packet to or from the mobile transceiver. The control module is further operable to provide the configuration information to the base station transceiver using the transceiver module.

Embodiments may enable a reduction of a load evoked by keepalive messages on an air interface by enabling a mobile transceiver to configure a base station transceiver to reply, answer or respond to keepalive messages without forwarding said keepalive messages to the mobile transceiver. Embodiments may enable mobile transceivers to configure a base station transceiver for a corresponding data service. In some embodiments the configuration information may indicate that a protocol context for a communication of control data packets and corresponding reply data packets for the data service is terminated at the base station transceiver, while a protocol context for payload data packets for the data service is terminated at the mobile transceiver.

In some embodiments the control module of the base station transceiver apparatus is operable to implement a notification client functionality of the data service for the mobile transceiver. The notification client functionality is operable to maintain and terminate a keepalive or heartbeat connection with the data server. The notification client functionality may be operable to relay notification data packets to the mobile transceiver. Embodiments may enable a base station transceiver to act as a notification client for a mobile transceiver.

In further embodiments the connection established between the data server and the mobile transceiver may correspond to a transport control protocol connection and the control data packet may correspond to a keepalive data packet. The control module may be operable to keep a transport control protocol connection to the data server active, without using radio resources for interim communication with the mobile transceiver. Embodiments may enable termination of a keepalive transport protocol connection at a base station transceiver transparent to a mobile transceiver.

In some embodiments the control module of the base station transceiver apparatus may be operable to monitor data packets of two or more data services used by the mobile transceiver. The control module may be operable to determine control data packets for the two or more data services, and to provide reply data packets for the control data packets to the data server without relaying the control data packets to the mobile transceiver, or to generate and provide control data packets for the two or more data services to the data server. Embodiments may enable a base station transceiver to monitor and control a signaling load for multiple applications or services of a mobile transceiver.

In further embodiments the control module may be operable to host a notification functionality of an operating system of the mobile transceiver. Embodiments may enable an operating system of a mobile transceiver to configure notification functionality at a base station transceiver and therewith enable more efficient application or service implementation at the mobile transceiver. In some embodiments the control module of the base station transceiver apparatus may be operable to communicate with the data server via a notification service server using the interface. The notification service server may be operable to embrace multiple connections to one or more data servers in a single connection to the mobile transceiver. The notification service server may implement a push notification service or a cloud to device messaging framework. Embodiments may enable a control mechanism for a signaling load for a notification service server.

Embodiments further provide a method for a base station transceiver of a mobile communication system. The method comprises communicating with a mobile transceiver. The mobile transceiver uses a data service provided by a data server. The method further comprises communicating with the data server providing the data service to the mobile transceiver. The method further comprises relaying data packets of the data service between the mobile transceiver and the data server. The method further comprises determining a control data packet for the data service between the data server and the mobile transceiver. The control data packet is intended to maintain a connection established between the data server to the mobile transceiver. The method further comprises providing a reply data packet for the control data packet to the data server without relaying the control data packet to the mobile transceiver, and/or generating and providing the control data packet to the data server.

Embodiments further provide a method for a mobile transceiver of a mobile communication system. The method comprises communicating with a base station transceiver and a data server. The mobile transceiver uses a data service provided by the data server. The method further comprises generating configuration information related to the data service. The configuration information indicates that a control data packet for the data service, which is intended to maintain a connection established between the data server and the mobile transceiver, is to be determined, generated and/or replied to at the base station transceiver without relaying the control data packet to or from the mobile transceiver. The method further comprises providing the configuration information to the base station transceiver using the transceiver module.

Embodiments further provide a computer program having a program code for performing one or more of the above described methods, when the computer program is executed on a computer, processor, or programmable hardware component. A further embodiment is a computer readable storage medium storing instructions which, when executed by a computer, processor, or programmable hardware component, cause the computer to implement one of the methods described herein.

BRIEF DESCRIPTION OF THE FIGURES

Some other features or aspects will be described using the following non-limiting embodiments of apparatuses or methods or computer programs or computer program products by way of example only, and with reference to the accompanying figures, in which.

DESCRIPTION OF EMBODIMENTS

Figure 1:
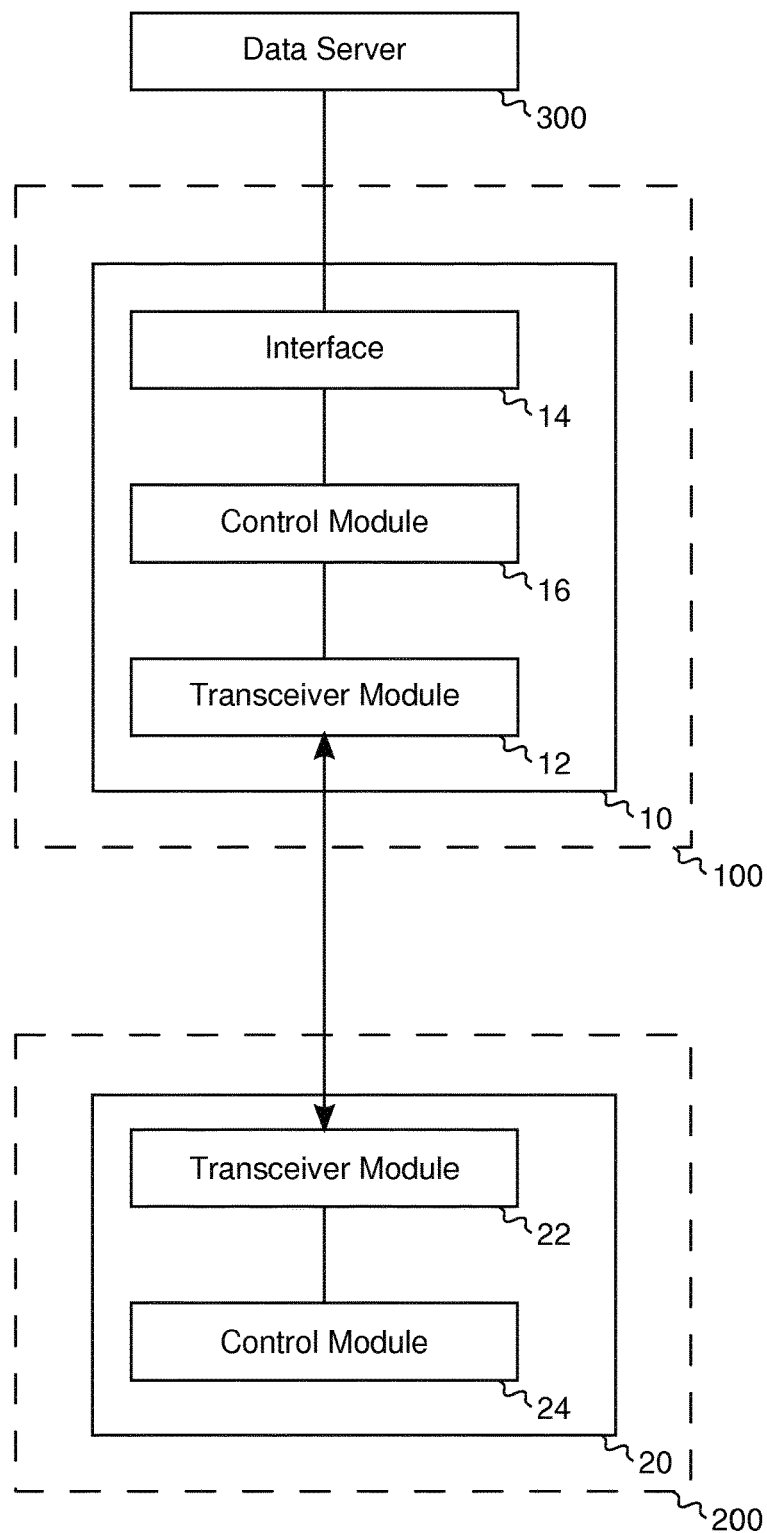
FIG. 1 illustrates a block diagram of an embodiment of an apparatus for a base station transceiver and a block diagram of an embodiment of an apparatus for a mobile transceiver.

Various example embodiments will now be described more fully with reference to the accompanying drawings in which some example embodiments are illustrated. In the figures, the thicknesses of lines, layers or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the invention. Like numbers refer to like or similar elements throughout the description of the figures.

As used herein, the term, "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted in a like fashion.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements or components, but do not preclude the presence or addition of one or more other features, integers, steps, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

In the following some embodiments of apparatuses, methods and computer programs for a base station transceiver and a mobile transceiver will be described. Embodiments further provide a base station transceiver and a mobile transceiver comprising such respective apparatuses. Embodiments may provide a control mechanism for a signaling overhead on an air interface between a base station transceiver and a mobile transceiver.

FIG. 1 illustrates a block diagram of an embodiment of an apparatus 10 operable in a base station transceiver of a mobile communication system. That is to say that the apparatus 10 may be operated or comprised in a base station transceiver. The apparatus 10 may hence also be referred to as base station transceiver apparatus 10. FIG. 1 further illustrates an embodiment of a base station transceiver 100 (broken lines), which comprises the apparatus 10.

FIG. 1 further illustrates a block diagram of an embodiment of an apparatus operable in a mobile transceiver of a mobile communication system. That is to say that the apparatus 20 may be operated or comprised in a mobile transceiver. The apparatus 20 may hence also be referred to as mobile transceiver apparatus 20. FIG. 1 further illustrates an embodiment of a mobile transceiver 200 (broken lines), which comprises the apparatus 20.

In general, the mobile communication system may, for example, correspond to one of the Third Generation Partnership Project (3GPP)-standardized mobile communication networks, where the term mobile communication system is used synonymously to mobile communication network. The mobile or wireless communication system may correspond to, for example, a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Interoperability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

A base station transceiver can be operable to communicate with one or more active mobile transceivers and a base station transceiver can be located in or adjacent to a coverage area of another base station transceiver, e.g. a macro cell base station transceiver or small cell base station transceiver. Hence, embodiments may provide a mobile communication system comprising one or more mobile transceivers and one or more base station transceivers, wherein the base station transceivers may establish macro cells or small cells, as e.g. pico-, metro-, or femto cells. A mobile transceiver may correspond to a smartphone, a cell phone, user equipment, radio equipment, a mobile, a mobile station, a laptop, a notebook, a personal computer, a Personal Digital Assistant (PDA), a Universal Serial Bus (USB)-stick, a car, etc. A mobile transceiver may also be referred to as User Equipment (UE) or mobile in line with the 3GPP terminology.

A base station transceiver can be located in the fixed or stationary part of the network or system. A base station transceiver may correspond to a remote radio head, a transmission point, an access point, radio equipment, a macro cell, a small cell, a micro cell, a femto cell, a metro cell etc. A base station transceiver may correspond to a base station understood as a logical concept of a node/entity terminating a radio bearer or connectivity over the air interface between a terminal/mobile transceiver and a radio access network. A base station transceiver can be a wireless interface of a wired network, which enables transmission of radio signals to a UE or mobile transceiver. Such a radio signal may comply with radio signals as, for example, standardized by 3GPP or, generally, in line with one or more of the above listed systems. Thus, a base station transceiver may correspond to a NodeB, an eNodeB, a Base Transceiver Station (BTS), an access point, a remote radio head, a transmission point etc., which may be further subdivided in a remote unit and a central unit.

A mobile transceiver can be associated, camped on, or registered with a base station transceiver or cell. The term cell refers to a coverage area of radio services provided by a base station transceiver, e.g. a NodeB (NB), an eNodeB (eNB), a remote radio head, a transmission point, etc. A base station transceiver may operate one or more cells on one or more frequency layers, in some embodiments a cell may correspond to a sector. For example, sectors can be achieved using sector antennas, which provide a characteristic for covering an angular section around a remote unit or base station transceiver. In some embodiments, a base station transceiver may, for example, operate three or six cells covering sectors of 120° (in case of three cells), 60° (in case of six cells) respectively. A base station transceiver may operate multiple sectorized antennas. In the following a cell may represent an according base station transceiver generating the cell or, likewise, a base station transceiver may represent a cell the base station transceiver generates.

In other words, in embodiments the mobile communication system may correspond to a HetNet, which utilizes different cell types, i.e. Closed Subscriber Group (CSG) cells and open cells, and cells of different sizes, as, for example, macro cells and small cells, where the coverage area of a small cell is smaller than the coverage area of a macro cell. A small cell may correspond to a metro cell, a micro cell, a pico cell, a femto cell, etc. Such cells are established by base station transceivers for which their coverage areas are determined by their transmission power and interference condition. In some embodiments a small cell's coverage area can at least partly be surrounded by or partly coincide with the coverage area of a macro cell established by another base station transceiver. The small cells can be deployed to extend the capacity of the network. A metro cell may therefore be used to cover a smaller area than a macro cell, e.g. a metro cell may cover a street or a section in a metropolitan area. For a macro cell the coverage area may have a diameter in the order of one or more kilometers, for a micro cell the coverage area may have a diameter below a kilometer, and for a pico cell the coverage area may have a diameter below a 100 m. A femto cell may be the smallest cell and it may be used to cover a household or gate section at the airport, i.e. its coverage area may have a diameter below 50 m. Thus, a base station transceiver may also be referred to as cell.

As shown in FIG. 1 the base station transceiver apparatus 10 comprises a transceiver module 12, which is operable to communicate with a mobile transceiver 200. The transceiver module 12, and also the transceiver module 22, which will be described subsequently for the mobile transceiver apparatus 20, may be implemented as any means for transceiving, i.e. receiving and/or transmitting etc., and it may comprise typical receiver and/or transmitter components, such as one or more elements of the group of one or more Low-Noise Amplifiers (LNAs), one or more Power Amplifiers (PAs), one or more filters or filter circuitry, one or more diplexers, one or more duplexers, one or more Analog-to-Digital converters (A/D), one or more Digital-to-Analog converters (D/A), one or more modulators or demodulators, one or more mixers, one or more antennas, etc.

In the embodiment depicted in FIG. 1 the mobile transceiver 200 uses a data service provided by a data server 300. The base station transceiver apparatus 10 further comprises an interface 14, which is operable to communicate with the data server 300 providing the data service to the mobile transceiver 200. In embodiments an interface of an entity, such as the interface 14, may correspond to any interface adapted to the respective communication or access technology. In some embodiments the apparatus 10 may have multiple interfaces. The one or more interfaces 14 may use the same or different access technologies, protocols, media, etc. For example the interface may correspond to an Ethernet interface, an Asynchronous Transfer Mode (ATM) interface, etc.

As shown in FIG. 1 the base station transceiver apparatus 10 further comprises a control module 16, which is coupled with the interface 14 and the transceiver module 12. In embodiments the control module 16, and also the subsequently described control module 24 of the mobile transceiver apparatus 20, may be implemented using one or more processing units, one or more processing devices, any means for processing, such as a processor, a computer or a programmable hardware component being operable with accordingly adapted software. In other words, the described functions of the control module 16 may as well be implemented in software, which is then executed on one or more programmable hardware components. Such hardware components may comprise a general purpose processor, a Digital Signal Processor (DSP), a micro-controller, etc.

The control module 16 of the base station transceiver apparatus is operable to control the transceiver module 12 and the interface 14. The control module 16 is further operable to relay data packets of the data service between the mobile transceiver 200 and the data server 300. The control module 16 is further operable to determine a control data packet for the data service between the data server 300 and the mobile transceiver 200. That is to say that the control module 16 is operable to determine a control data packet transmitted by the data server 300 and/or the control module 16 is operable to determine a control data packet which is to be transmitted or provided to the data server 300. The control data packet is intended to maintain a connection established between the data server 300 and the mobile transceiver 200. The control module 16 is further operable to provide a reply data packet for the control data packet to the data server 300 without relaying the control data packet to the mobile transceiver 200, and/or to generate, create or compose a control data packet, and to provide or transmit the control data packet to the data server 300.

In embodiments, different mechanisms may be in place at the apparatus 10 to determine a control data packet. In some embodiments the control module 16 is operable to determine the control data packet using packet inspection of the data packets transmitted from the data server 300 to the mobile transceiver 200. In some embodiments the control module 16 may assume functionality from or for the mobile transceiver 200, such as generating, creating or composing control data packets, for example, in terms of keepalive messages, and provide or transmit them to the data server 300, receive response, answer or reply data packets for the provided control data packets from the data server 300, respectively. The control module 16 may be operable to determine the control data packet by monitoring data packets of the same size being periodically transmitted from the data server 300 to the mobile transceiver 200. In other words the control module 16 may be operable to inspect or examine the data packets transmitted from the data server 200 to the mobile transceiver 200 and determine a control data packet by means of determined header or payload properties of the respective data packet. In some embodiments the control module 16 may be operable to determine whether a data packet transmitted from the data server 300 to the mobile transceiver 200 comprises a payload data portion and to determine the control data packet when the payload data portion is missing in the data packet. That is to say, if the data packet does not comprise a payload portion or a payload portion of zero size, the control module 16 may determine a control data packet. The control module 16 may be further operable to relay a data packet to the mobile transceiver 200 when the data packet comprises a payload data portion. In other words, data packets with a non-zero payload data portion are then relayed to the mobile transceiver 200.

In some embodiments, information on the control data packet determination may be provided by the mobile transceiver 200 comprising a mobile transceiver apparatus 20 as shown in FIG. 1. The mobile transceiver apparatus 20 is operable in the mobile transceiver 200 of the mobile communication system. The apparatus 20 comprises a transceiver module 22, which is operable to communicate with the base station transceiver 100 and the data server 300. The mobile transceiver 200 uses a data service provided by the data server 300. In line with the above, the transceiver module 22 may be implemented in line with the transceiver module 12 as described for the base station transceiver 100; it may however be adapted to the needs or requirements of the mobile transceiver 200.

The mobile transceiver apparatus 20 further comprises a control module 24, which is coupled to the transceiver module 22. In line with the above, the control module 24 may be implemented in line with the control module 16 as described for the base station transceiver 100; it may however be adapted to the needs or requirements of the mobile transceiver 200. The control module 24 is operable to control the transceiver module 22. The control module 24 is further operable to generate configuration information related to the data service. The configuration information indicates that a control data packet for the data service, which is intended to maintain a connection established between the data server 300 and the mobile transceiver 200, is to be determined, generated and/or replied/answered/responded to at the base station transceiver 100 without relaying the control data packet to or from the mobile transceiver 200. The control module 24 is further operable to provide the configuration information to the base station transceiver 100 using the transceiver module 22. That is to say that the configuration information may additionally or alternatively indicate that a control data packet for the data service, which is intended to maintain a connection established between the data server 300 and the mobile transceiver 200, is to be generated at the base station transceiver 200.

In other words, the control module 24 may configure the above base station transceiver apparatus 10 to assume functionality from or for the mobile transceiver 200. For example, such functionality may comprise detecting and responding to control data packets, for example, in terms of keepalive messages, from the data server 300, generating, creating or composing control data packets and provide or transmit them to the data server 300, receive response, answer or reply data packets for the provided control data packets from the data server 300, respectively.

The configuration information may indicate that a protocol context for a communication of control data packets and corresponding reply data packets for the data service are terminated at the base station transceiver 100, while a protocol context for payload data packets for the data service is terminated at the mobile transceiver 200. At the base station transceiver apparatus the control module 16 may be operable to receive configuration information from the mobile transceiver 200 using the transceiver module 12.

Embodiments may therefore reduce or even avoid a signaling load on the air interface, which is evoked by control data packets relayed or forwarded from a base station transceiver 100 to a mobile transceiver 200. Such control data packets may have the purpose of keeping a higher layer protocol context active or vital. In the RAN however, this may result in frequent state changes of the mobile transceivers. For example, in an LTE or LTE-A network the mobile transceivers may have to change their Radio Resource Control (RRC) states from idle to active in order to receive such a higher layer control packet, for example, in a TCP context. Such state changes may involve several signaling procedures, for example radio bearer establishment, service request, paging, and generate a signaling overhead. For example, in some application such keepalive control data packets may be transmitted every couple of minutes, for example every five minutes in case no other payload data is transmitted. However, radio resource management in the RAN may transfer a mobile transceiver from active state to idle state after a shorter amount of time, for example after 30 seconds of inactivity to prevent radio resource shortage, blocking or dropping of calls or connections, respectively. In such a scenario the keepalive control data packets trigger RRC state change procedures and the corresponding signaling in the RAN.

The load from the control data packets may result from different facts. For example, some TCP connections are in fact not absolutely idle but the connection end points exchange for several reasons, e.g. to avoid the removal of Network Address Translation (NAT) table entries, supervision of connectivity, Firewalls, etc., keepalive or heart beat messages. Typical values for the periods of such heartbeats are in the range from minutes or even seconds to 10 s of minutes. The load caused by periodic keepalive messages not carrying any useful user data may be immense and it may be further aggravated by the underlying signaling. For example, a single keepalive message may imply the exchange of around 15 signaling messages, even around 36 signaling messages, if the physical layer signaling is also accounted for in a RAN. Therefore the keepalive control data packets may cause an extreme signaling load. There are numerous reports of congestion situations in RANs, to which it is often referred to as signaling storms, impacting the overall wireless network service, which are a result of the described signaling. It may be noted that such a mechanism may as well be used by an attacker to generate denial of service attacks, i.e. to impair service availability or service quality of a RAN by consuming, occupying, or blocking signaling radio resources to a significant extent.

High signaling activity on the air interface caused by the notification services may drain mobile terminals battery, force the mobile network to allocate significant resources (power, signaling capacity, bearers, etc.) not being available for communication services, and prevent efficient application of energy saving techniques based on sleep modes in the base stations. Embodiments may provide a concept, which allows efficient provision of internet notification services over mobile networks.

Figure 2:
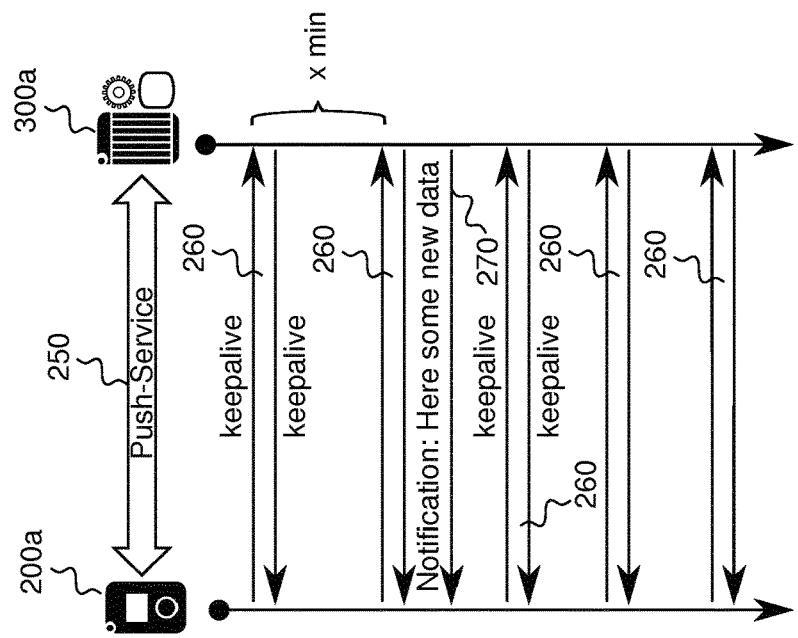
FIG. 2 illustrates a message flow of an internet push service.
Figure 2:
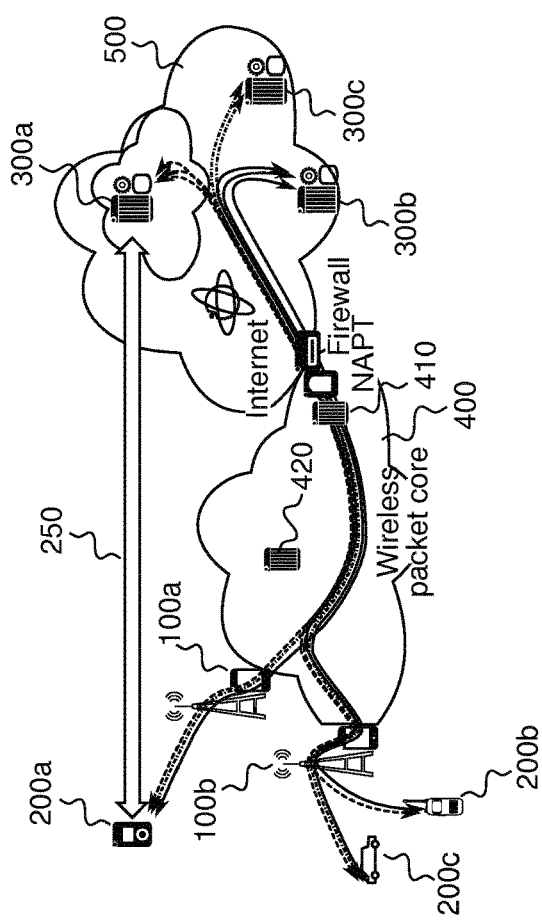

FIG. 2 illustrates a message flow of an internet push service. FIG. 2 shows, on the left hand side, a mobile transceiver 200a which wirelessly communicates with a base station transceiver 100a. The mobile transceiver 200a uses a data service, which is provided by a data server 300a. The data service is assumed to be or comprise one or more end-to-end Over The Top (OTT) Internet Protocol (IP) push services using persistent connections and is represented by an arrow 250 in FIG. 2. As further illustrated by FIG. 2 there may be further mobile transceivers 200b, 200c and further base station transceivers 100b. The base station transceivers 100a, 100b are coupled to a wireless packet Core Network (CN) 400, which may comprise several processing units or gateways, one which is shown in FIG. 2 as gateway 410 and another one is the Mobility Management Entity (MME) 420. In FIG. 2 gateway 410 is assumed to further implement a firewall and Network Address Port Translation (NAPT). Gateway 410 further establishes an interface to the internet 500, which is represented in FIG. 2 by multiple data servers 300a, 300b, and 300c. It is to be noted that one of the data servers 300a-c may provide multiple data services to a mobile transceiver 200a, a mobile transceiver 200a may consume or use multiple data services 250 from multiple data servers 300a-c.

For internet push services 250 periodic keepalive messages are exchanged between terminal 200a and servers 300a-c to keep connections open. In general each keepalive exchange may be accompanied on the air interface by more than 10 signaling messages. Considering that a cell might easily host more than 1000 terminals 200abc, a terminal may 10 host several Apps built on push paradigm and the short periods, it may be considered evident that signaling traffic may become unsustainable. FIG. 2 illustrates the service situation but does not show the 10 s of additional signaling messages accompanying each of the keepalive exchanges. FIG. 2 further shows on the right hand side a message sequence chart depicting a message or information exchange between a mobile transceiver 200a and a data server 300a for the push service 250. The message sequence chart illustrates that a number of keepalive handshakes 260 (control data packet and associated reply data packet) takes place for a single data exchange 270 in this example. The time between two keepalive handshakes 260 is given by x min in FIG. 2, where x may, for example, range in between 1 and 30.

In some embodiments a smartphone's or a mobile transceiver's 200a operating system, for example Apple iOperating System (OS), Google Android, Microsoft Windows Phone, etc., may consider that the above messaging sequence may reduce the battery lifetime of a smartphone or mobile transceiver 200a. In some embodiments notification services may be offered to mitigate the impact on the terminals. In other words cloud based infrastructure of push notification servers may be provided and corresponding client functionality for these servers may be included in a smartphone's or mobile transceiver's operating system.

Figure 3:
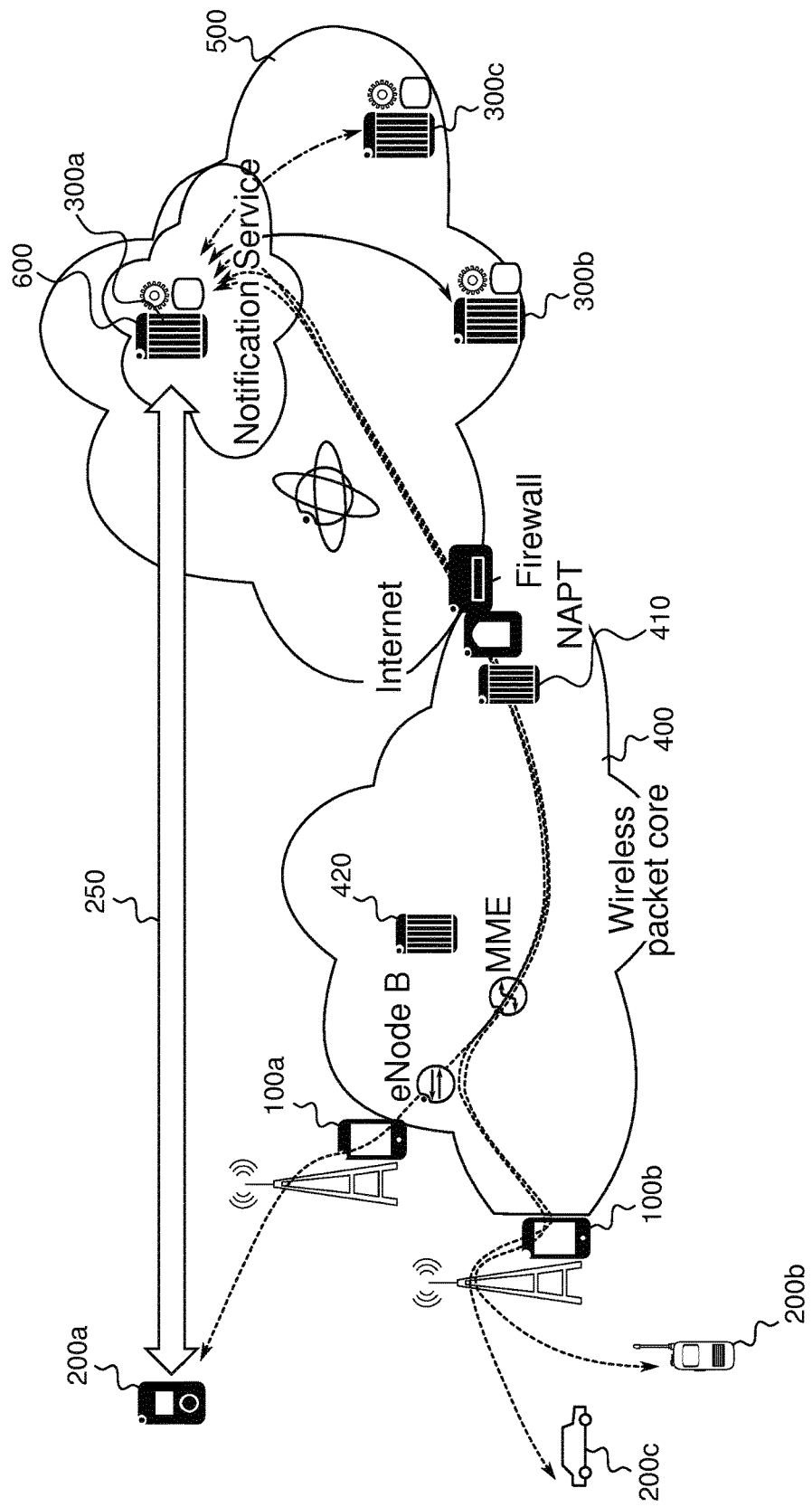
FIG. 3 illustrates a message flow of an internet push service using a notification service server.

FIG. 3 illustrates a message flow of an internet push service using a notification service server 600. FIG. 3 illustrates similar components as FIG. 2 on the left hand side and similar reference signs reference similar components. FIG. 3 shows that data server 300a also comprises the functionality of the push notification server 600, which in this scenario bundles the push data services of data servers 300abc such that only a single connection to the mobile transceiver 200a is kept alive and keepalive signaling for multiple data services may be reduced. A number of open connections may be reduced by introducing notification service servers 600. However, for maintenance of the connection to the server 600 keepalive messages may still be exchanged evoking signaling load on the air interface.

The respective names of these services are Apple Push Notification Service (APNS), Android Cloud to Device Messaging Framework (C2DM) and Microsoft Push Notification Service (MPNS). These notification services allow in principle that one smartphone or mobile transceiver might not maintain tens of idling persistent TCP connections, but only one towards the Notification Server in charge. However, this still means that for each smartphone every e.g. 5 minutes keepalive e.g. 'empty' TCP packets are transmitted between terminal and base station and vice versa, with all the related overhead and in addition a multitude of signaling messages related to this transmission may be exchanged. Having only a single connection to be kept alive may improve a battery drain of a mobile transceiver. However, a wireless network may still support a high background and signaling traffic caused by the persistent (TCP) connection kept alive.

Figure 4:
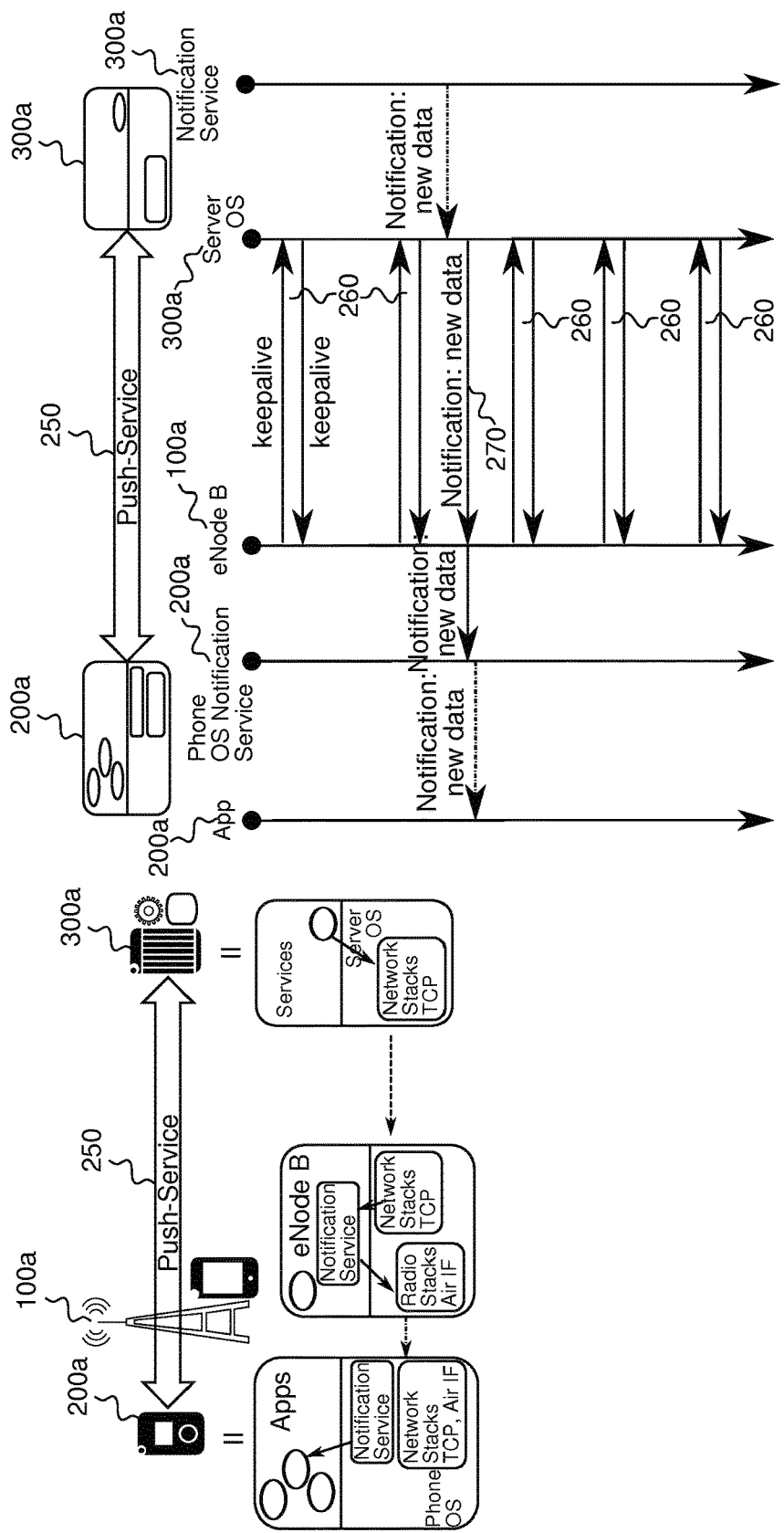
FIG. 4 illustrates a message flow of an embodiment.

FIG. 4 illustrates a message flow of an embodiment. FIG. 4 shows on the left hand side a scenario with an embodiment of a mobile transceiver 200a, a base station transceiver 100a, and a data server 300a. The data server 300a provides a push service 250 to the mobile transceiver 200a in line with what is described above. The RAN can be assumed as an LTE or LTE-A network in the present embodiment. The mobile transceiver 200a runs or executes multiple Apps some of which use the push service 250. The mobile transceiver's Operating System (OS) makes use of corresponding network protocol stacks for the RAN, such as air interface protocols, and a TCP connection for a notification service on top of the RAN protocol stack (vertical interaction with the RAN protocols). The base station transceiver 100a, which is assumed to be an e-NodeB in the present embodiment, executes the corresponding network protocol stacks, such as radio protocol stacks and air interface protocols. Furthermore, the base station transceiver 100a communicates with the data server 300a using corresponding network protocols or protocol stack such as TCP. The base station transceiver 100a runs a notification service for the push service 250. As further shown in FIG. 4 the data server 300a runs or executes corresponding network protocol stacks such as TCP to provide the push service 250.

In the present embodiment the control module 16 of the base station transceiver apparatus 10 at the base station transceiver 100a is operable to implement a notification client functionality of the data service for the mobile transceiver 200a. The notification client functionality is operable to maintain and terminate a keepalive or heartbeat connection with the data server 300a. The notification client functionality is operable to relay notification data packets to the mobile transceiver 200a. As depicted in FIG. 4 on the right hand side, the push service 250 is established between the mobile transceiver 200a and the data server 300a. In the message sequence chart of FIG. 4 information or messages are illustrated, which are exchanged between the App run on the mobile transceiver 200a, the OS notification service of the mobile transceiver 200a, the notification service run at the base station transceiver 100a, the OS run on the data server 300a, and the notification service run on the data server 300a. As shown in FIG. 4 keepalive messages are exchanged between the base station transceiver 100a and the data server 300a, but not relayed to the mobile transceiver 200a. Actual payload or new data is relayed by the base station transceiver 100a to the mobile transceiver 200a using the respective notification services.

In embodiments a TCP connection established for notification services may be terminated in the mobile network at the base station transceiver 100a and not in the wireless terminal 200a. In other words, in the embodiment of FIG. 4 the connection established between the data server 300a and the mobile transceiver 200a corresponds to a TCP connection. The control data packet corresponds to a keepalive data packet. The control module 16 at the base station transceiver 100a is operable to keep the TCP connection to the data server 300a active, without using radio resources for interim communication with the mobile transceiver 200a.

By this the base stations 100a and terminals 200a may only be involved in actual transmissions over the air interface, if actual notifications for the terminal occur. The keepalive messages are not conveyed over the air interface and therefore do not cause signaling load. In embodiments the control module 16 may be operable to monitor data packets of two or more data services 250 used by the mobile transceiver 200a. The control module 16 is then operable to determine control data packets for the two or more data services, and to provide reply data packets for the control data packets to the data server 300a without relaying the control data packets to the mobile transceiver 200a, or to generate and provide control data packets for the two or more data services to the data server 300, respectively.

To allow distinguishing between notification TCP connections and others, embodiments may build upon notification services of the different smartphone OS suppliers and to move the notification client functionality from the smartphone 200a to the mobile network into the base station 100a as illustrated by FIG. 4. In other words, the control module 16 may be operable to host a notification functionality of an operating system of the mobile transceiver 200a. This (proxy)-client in the base station 100a may terminate the notification TCP connection and maintain the TCP connection exchanging the keepalives or heartbeats.

In case of a real notification, i.e. TCP messages with non-empty payload received by notification service in the base station 100a, the terminal (UE) 200a may be informed via the air interface. Thus some embodiments may remove most of the load on the air interface otherwise caused by the notification service. In other words, in some embodiments the control module 16 is operable to communicate with the data server 300 via a notification service server 600 using the interface 14. The notification service server 600 may be operable to embrace multiple connections to one or more data servers 300a-c in a single connection to the mobile transceiver 200a. The notification service server 600 may implement a push notification service or a cloud to device messaging framework.

In the embodiment depicted in FIG. 4 a virtual environment capable to host notification functionality of a smartphone 200a OS, for example Apples iOS, may be provided on each base station 100abc supporting this feature. The terminal's 200a OS and the "proxy" notification service in the base station (eNB) 100a may interact via a respective interface provided over a dedicated radio bearer.

The "proxy" notification service in the base station 100a may maintain the persistent connection to the notification service in the cloud, for example Apple Push Notification Service server 600, which may be permanently active. However, messages between the "proxy" notification service and the OS in the terminal 200a may be only exchanged in case of an actual notification.

Architecture in embodiments may allow keeping TCP connections running without wasting air interface resources. The typical application may run in the system without the described performance degradation and the user experience might not be negatively impacted but improved due to better battery lifetime.

Figure 5:
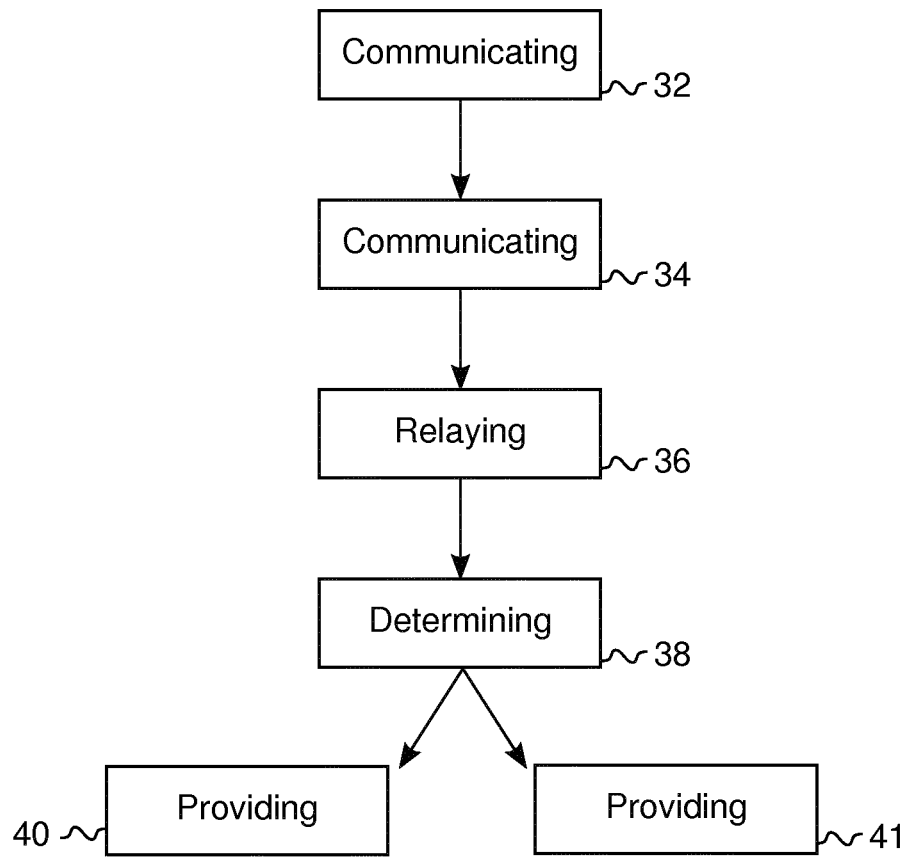
FIG. 5 shows a block diagram of a flow chart of an embodiment of a method for a base station transceiver.

FIG. 5 shows a block diagram of a flow chart of an embodiment of a method for a base station transceiver 100 of a mobile communication system. The method comprises communicating 32 with a mobile transceiver 200. The mobile transceiver 200 uses a data service provided by a data server 300. The method further comprises communicating 34 with the data server 300 providing the data service to the mobile transceiver 200. The method further comprises relaying 36 data packets of the data service between the mobile transceiver 200 and the data server 300. The method further comprises determining 38 a control data packet for the data service between the data server 300 and the mobile transceiver 200. The control data packet is intended to maintain a connection established between the data server 300 to the mobile transceiver 200. The method further comprises providing 40 a reply data packet for the control data packet to the data server 300 without relaying the control data packet to the mobile transceiver 200, and/or generating and providing 41 the control data packet to the data server 300.

Figure 6:
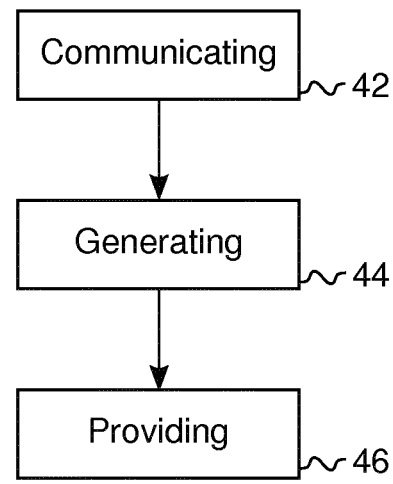
FIG. 6 shows a block diagram of a flow chart of an embodiment of a method for a mobile transceiver.

FIG. 6 shows a block diagram of a flow chart of an embodiment of a method for a mobile transceiver 200 of a mobile communication system. The method comprises communicating 42 with a base station transceiver 100 and a data server 300. The mobile transceiver 200 uses a data service provided by the data server 300. The method further comprises generating 44 configuration information related to the data service. The configuration information indicates that a control data packet for the data service, which is intended to maintain a connection established between the data server 300 and the mobile transceiver 200, is to be determined, generated and/or replied to at the base station transceiver 100 without relaying the control data packet to or from the mobile transceiver 200. The method further comprises providing 46 the configuration information to the base station transceiver 100 using the transceiver module 22.

A further embodiment is a computer readable storage medium storing instructions which, when executed by a computer, cause the computer to implement one of the methods described herein. Other embodiments are a computer program or a computer program product having a program code for performing anyone of the above described methods, when the computer program or computer program product is executed on a processor, computer, or programmable hardware.

Embodiments may enable a concept for controlling signaling storms caused by smartphones or mobile transceivers using push services. Embodiments may reduce the signaling overhead on the air interface without or with a limited negative impact on the performance of the applications. Embodiments may enable a "hosting part of the service provisioning in the radio nodes" to be adoptable to enable other measures which allow to dramatically improve the efficiency of service provisioning over mobile networks (e.g. context aware video service provisioning). Embodiments may enable improvements in service and energy efficiency, which may also be targeted by future 5G networks seem not to be viable.

Embodiments may allow minimizing or reducing of the air interface resource usage for keepalive messages, especially avoiding or reducing the 10 s of signaling messages, which are in general caused by each single keepalive exchange. This is possible as embodiments may enable termination of a protocol context for the keepalive messages at the base station without sending them over the air interface. In terms of numbers the savings depending on the context may amount to reduced signaling traffic up to a factor of 1000 in some scenarios.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media such as magnetic disks and magnetic tapes, hard drives, or optically readable digital data storage media. The embodiments are also intended to cover computers programmed to perform said steps of methods described herein or (field) programmable logic arrays ((F)PLAs) or (field) programmable gate arrays ((F)PGAs), programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Functional blocks denoted as "means for . . . " (performing a certain function) shall be understood as functional blocks comprising circuitry that is adapted for performing or to perform a certain function, respectively. Hence, a "means for s.th." may as well be understood as a "means being adapted or suited for s.th.". A means being adapted for performing a certain function does, hence, not imply that such means necessarily is performing said function (at a given time instant).

The functions of the various elements shown in the Figures, including any functional blocks labeled as "means", "means for controlling", "means for transmitting", "means for receiver", "means for transceiving", "means for processing", etc., may be provided through the use of dedicated hardware, such as "a controller", "a transmitter", "a receiver", "a transceiver", "a processor", etc. as well as hardware capable of executing software in association with appropriate software. Moreover, any entity described herein as "means", may correspond to or be implemented as "one or more modules", "one or more devices", "one or more units", etc. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods.

The invention claimed is:

1. An apparatus operable in a base station transceiver of a mobile communication system, the apparatus comprising:
    a transceiver of the base station transceiver configured to communicate with a mobile transceiver, the mobile transceiver using a data service provided by a data server;
    an interface operable to communicate with the data server providing the data service to the mobile transceiver; and
    a controller configured to:
        control the transceiver of the base station transceiver and the interface,
        relay data packets of the data service between the mobile transceiver and the data server,
        determine a control data packet for the data service between the data server and the mobile transceiver, the control data packet being intended to maintain a connection established between the data server and the mobile transceiver, and
            provide a reply data packet for the control data packet to the data server without relaying the control data packet to the mobile transceiver, and/or
            generate and provide the control data packet to the data server without relaying the control data packet to the mobile transceiver;
        wherein the controller is configured to receive configuration information from the mobile transceiver using the transceiver of the base station transceiver, the configuration information indicating that the control data packet for the data service is intended to maintain a connection established between the data server and the mobile transceiver is to be determined and replied to at the base station transceiver without relaying the control data packet to the mobile transceiver, and/or the configuration information indicating that the control data packet for the data service is intended to maintain a connection established between the data server and the mobile transceiver is to be generated at the base station transceiver; and
        wherein the configuration information indicates that a protocol context for a communication of control data packets and corresponding reply data packet for the data service is terminated at the base station transceiver, while a protocol context for payload data packets for the data service is terminated at the mobile transceiver.

2. The apparatus of claim 1, wherein the controller is configured to determine the control data packet using packet inspection of the data packets transmitted from the data server to the mobile transceiver.

3. The apparatus of claim 1, wherein the controller is configured to determine whether a data packet transmitted from the data server to the mobile transceiver comprises a payload data portion and to determine the control data packet when the payload data portion is missing in the data packet, and/or wherein the controller is configured to relay a data packet to the mobile transceiver when the data packet comprises a payload data portion.

4. The apparatus of claim 1, wherein the controller is configured to implement a notification client functionality of the data service for the mobile transceiver, wherein the notification client functionality is operable to maintain and terminate a keepalive or heartbeat connection with the data server, and wherein the notification client functionality is operable to relay notification data packets to the mobile transceiver.

5. The apparatus of claim 1, wherein the connection established between the data server and the mobile transceiver corresponds to a transport control protocol connection and wherein the control data packet corresponds to a keepalive data packet, and wherein the controller is configured to keep a transport control protocol connection to the data server active, without using radio resources for interim communication with the mobile transceiver.

6. The apparatus of claim 1, wherein the control is configured to monitor data packets of two or more data services used by the mobile transceiver, and wherein the controller is configured to determine the control data packets for the two or more data services, and to provide reply data packets for the control data packets to the data server without relaying the control data packets to the mobile transceiver or to generate and provide control data packets for the two or more data services to the data, server.

7. The apparatus of claim 1, wherein the controller is configured to host a notification functionality of an operating system of the mobile transceiver.

8. The apparatus of claim 1, wherein the controller is configured to communicate with the data server via a notification service server using the interface, the notification service server being configured to embrace multiple connections to one or more data servers in a single connection to the mobile transceiver, and/or wherein the notification service server implements a push notification service or a cloud to device messaging framework.

9. The apparatus of claim 1, wherein the controller is configured to determine the control data packet by monitoring data packets of the same size being periodically transmitted from the data server to the mobile transceiver.

10. An apparatus operable in a mobile transceiver of a mobile communication system, the apparatus comprising
    a transceiver of the mobile transceiver to communicate with a base station transceiver and a data server, the mobile transceiver using a data service provided by the data server; and
    a controller configured to:
    control the transceiver of the mobile transceiver,
    generate configuration information related to the data service, the configuration information indicating that a control data packet for the data service is intended to maintain a connection established between the data server and the mobile transceiver is to be determined, generated and/or replied to at the base station transceiver without relaying the control data packet to or from the mobile transceiver, and provide the configuration information to the base station transceiver using the transceiver of the mobile transceiver.

11. The apparatus of claim 10, wherein the configuration information indicates that a protocol context for a communication of control data packets and corresponding reply data packet for the data service is terminated at the base station transceiver, while a protocol context for payload data packets for the data service is terminated at the mobile transceiver.

12. A method for a base station transceiver of a mobile communication system, the method comprising
communicating with a mobile transceiver, the mobile transceiver using a data service provided by a data server;
communicating with the data server providing the data service to the mobile transceiver;
relaying data packets of the data service between the mobile transceiver and the data server;
determining a control data packet for the data service between the data server and the mobile transceiver, the control data packet being intended to maintain a connection established between the data server to the mobile transceiver;
providing a reply data packet for the control data packet to the data server without relaying the control data packet to the mobile transceiver, and/or generating and providing the control data packet to the data server without relaying the control data packet to the mobile transceiver; and
receiving configuration information from the mobile transceiver using a transceiver of the base station transceiver, the configuration information indicating that the control data packet for the data service is intended to maintain a connection established between the data server and the mobile transceiver is to be determined and replied to at the base station transceiver without relaying the control data packet to the mobile transceiver, and/or the configuration information indicating that the control data packet for the data service is intended to maintain a connection established between the data server and the mobile transceiver is to be generated at the base station transceiver;
wherein the configuration information indicates that a protocol context for a communication of control data packets and corresponding reply data packet for the data service is terminated at the base station transceiver, while a protocol context for payload data packets for the data service is terminated at the mobile transceiver.

13. A method for a mobile transceiver of a mobile communication system, the method comprising
communicating with a base station transceiver and a data server, the mobile transceiver using a data service provided by the data server;
generating configuration information related to the data service, the configuration information indicating that a control data packet for the data service is intended to maintain a connection established between the data server and the mobile transceiver is to be determined, generated and/or replied to at the base station transceiver without relaying the control data packet to or from the mobile transceiver; and
providing the configuration information to the base station transceiver using a transceiver of the mobile transceiver.

14. A non-transitory computer readable medium including thereon a computer program having a program code, such that when the computer program is executed on a computer, a processor, or a programmable hardware component, a base station transceiver of a mobile communication system is caused to:
communicate with a mobile transceiver, the mobile transceiver using a data service provided by a data server;
communicate with the data server providing the data service to the mobile transceiver;
relay data packets of the data service between the mobile transceiver and the data server;
determine a control data packet for the data service between the data server and the mobile transceiver, the control data packet being intended to maintain a connection established between the data server to the mobile transceiver;
provide a reply data packet for the control data packet to the data server without relaying the control data packet to the mobile transceiver, and/or generate and provide the control data packet to the data server without relaying the control data packet to the mobile transceiver; and
receive configuration information from the mobile transceiver using a transceiver of the base station transceiver, the configuration information indicating that the control data packet for the data service is intended to maintain a connection established between the data server and the mobile transceiver is to be determined and replied to at the base station transceiver without relaying the control data packet to the mobile transceiver, and/or the configuration information indicating that the control data packet for the data service is intended to maintain a connection established between the data server and the mobile transceiver is to be generated at the base station transceiver;
wherein the configuration information indicates that a protocol context for a communication of control data packets and corresponding reply data packet for the data service is terminated at the base station transceiver, while a protocol context for payload data packets for the data service is terminated at the mobile transceiver.

15. A non-transitory computer readable medium including thereon a computer program having a program code, such that when the computer program is executed on a computer, a processor, or a
programmable hardware component, a mobile transceiver of a mobile communication system is caused to:
communicate with a base station transceiver and a data server, the mobile transceiver using a data service provided by the data server;
generate configuration information related to the data service, the configuration information indicating that a control data packet for the data service is intended to maintain a connection established between the data server and the mobile transceiver is to be determined, generated and/or replied to at the base station transceiver without relaying the control data packet to or from the mobile transceiver; and
provide the configuration information to the base station transceiver using a transceiver of the mobile transceiver.

* * * * *